(12) United States Patent
Hariton (10) Patent No.: US 10,133,455 B2
(45) Date of Patent: *Nov. 20, 2018

(54) DISTRIBUTED SCRIPTING FOR PRESENTATIONS WITH TOUCH SCREEN DISPLAYS

(71) Applicant: Nicholas T. Hariton, Los Angeles, CA (US)

(72) Inventor: Nicholas T. Hariton, Los Angeles, CA (US)

(*) Notice: Subject to any disclaimer, the term of this patent is extended or adjusted under 35 U.S.C. 154(b) by 197 days.

This patent is subject to a terminal disclaimer.

(21) Appl. No.: 15/193,401

(22) Filed: Jun. 27, 2016

(65) Prior Publication Data

US 2016/0306516 A1  Oct. 20, 2016

Related U.S. Application Data

(63) Continuation of application No. 13/903,776, filed on May 28, 2013, now Pat. No. 9,400,593, which is a
(Continued)

(51) Int. Cl.
  *G06F 17/00* (2006.01)
  *G06F 3/0484* (2013.01)
  (Continued)

(52) U.S. Cl.
  CPC .......... *G06F 3/0484* (2013.01); *G06F 3/0481* (2013.01); *G06F 3/04883* (2013.01);
  (Continued)

(58) Field of Classification Search
  CPC .................................................. G06F 17/30017
  See application file for complete search history.

(56) References Cited

U.S. PATENT DOCUMENTS 4,479,195 A  10/1984  Herr et al.
4,616,327 A  10/1986  Rosewarne et al.
(Continued)

FOREIGN PATENT DOCUMENTS

CA  2253867 A1  11/1997
EP  1579654 B1  2/2010
(Continued)

OTHER PUBLICATIONS

Large Screen Displays (name of company); Pi Projected Images Touch Screen Bezels (name of product); Jul. 13, 2004; 1 pg., Santa Ana, CA 92704.
(Continued)

*Primary Examiner* — Laurie A Ries
(74) *Attorney, Agent, or Firm* — Pritzkau Patent Group, LLC (57) ABSTRACT

A live presentation may be prepared and displayed by providing a primary scripting room for preparing a presentation script and a control computer in the primary scripting computer for use by a control operator to view and/or edit possible contributions to the presentation script and for saving the presentation script being preparing. At least one remote scripting room may be connected to the primary scripting room by network to form a virtual scripting room therewith. A remote computer may be provided in the remote scripting room for operation by a contributor to provide possible contributions to the presentation script viewable by the remote operator. At least portions of the saved scripted presentation may be presented on a display computer as the live presentation.

28 Claims, 8 Drawing Sheets

Related U.S. Application Data continuation of application No. 12/554,738, filed on Sep. 4, 2009, now Pat. No. 8,473,835, which is a continuation of application No. 11/227,001, filed on Sep. 14, 2005, now abandoned.

(60) Provisional application No. 60/609,796, filed on Sep. 14, 2004.

(51) Int. Cl.

| | |
|---|---|
| G06F 17/30 | (2006.01) |
| G09B 19/00 | (2006.01) |
| G11B 27/034 | (2006.01) |
| H04N 5/222 | (2006.01) |
| G06F 3/0481 | (2013.01) |
| G06F 3/0488 | (2013.01) |
| G06F 17/24 | (2006.01) |
| H04L 29/06 | (2006.01) |

(52) U.S. Cl.
CPC ...... *G06F 17/243* (2013.01); *G06F 17/30017* (2013.01); *G06F 17/30056* (2013.01); *G09B 19/00* (2013.01); *G11B 27/034* (2013.01); *H04L 65/4076* (2013.01); *H04N 5/222* (2013.01)

(56) References Cited

U.S. PATENT DOCUMENTS

| | | |
|---|---|---|
| 4,695,975 A | 9/1987 | Bedrij |
| 4,766,381 A | 8/1988 | Korn et al. |
| 4,766,581 A | 8/1988 | Korn et al. |
| 4,864,516 A | 9/1989 | Gaither et al. |
| 4,876,657 A | 10/1989 | Saito et al. |
| 4,905,094 A | 2/1990 | Pocock et al. |
| 4,949,300 A | 8/1990 | Christenson et al. |
| 4,962,475 A | 10/1990 | Hernandez et al. |
| 5,008,853 A | 4/1991 | Bly et al. |
| 5,072,412 A | 12/1991 | Henderson, Jr. et al. |
| 5,093,907 A | 3/1992 | Hwong et al. |
| 5,119,188 A | 6/1992 | McCalley et al. |
| 5,119,474 A | 6/1992 | Beitel et al. |
| 5,204,768 A | 4/1993 | Tsakiris et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,303,042 A | 4/1994 | Lewis et al. |
| 5,307,055 A | 4/1994 | Buskin et al. |
| 5,379,374 A | 1/1995 | Ishizaki et al. |
| 5,446,842 A | 8/1995 | Schaeffer et al. |
| 5,448,263 A | 9/1995 | Martin |
| 5,473,744 A | 12/1995 | Allen et al. |
| 5,539,658 A | 7/1996 | McCullough |
| 5,577,188 A | 11/1996 | Zhu |
| 5,581,760 A | 12/1996 | Atkinson |
| 5,608,872 A | 3/1997 | Schwartz et al. |
| 5,617,539 A | 4/1997 | Ludwig et al. |
| 5,623,603 A | 4/1997 | Jiang et al. |
| 5,649,104 A | 7/1997 | Carleton et al. |
| 5,664,126 A | 9/1997 | Hirakawa |
| 5,671,428 A | 9/1997 | Muranaga et al. |
| 5,758,110 A | 5/1998 | Boss et al. |
| 5,781,727 A | 7/1998 | Carleton et al. |
| 5,781,732 A | 7/1998 | Adams |
| 5,815,392 A | 9/1998 | Bennett et al. |
| 5,822,525 A | 10/1998 | Tafoya et al. |
| 5,864,711 A | 1/1999 | Mairs et al. |
| 5,874,960 A | 2/1999 | Mairs et al. |
| 5,890,177 A | 3/1999 | Moody et al. |
| 5,907,704 A | 5/1999 | Gudmundson |
| 5,915,091 A | 6/1999 | Ludwig et al. |
| 5,944,791 A | 8/1999 | Scherpbier |
| 5,948,022 A | 9/1999 | Carelton et al. |
| 5,960,448 A | 9/1999 | Reichek et al. |
| 5,974,446 A | 10/1999 | Sonnenreich et al. |
| 5,978,835 A | 11/1999 | Ludwig et al. |
| 5,983,263 A | 11/1999 | Rothrock et al. |
| 6,002,398 A | 12/1999 | Wilson |
| 6,088,702 A | 7/2000 | Plantz et al. |
| 6,091,408 A | 7/2000 | Treibitz et al. |
| 6,121,968 A | 9/2000 | Arcuri et al. |
| 6,128,629 A | 10/2000 | Bretschneider et al. |
| 6,167,432 A | 12/2000 | Jiang |
| 6,182,123 B1 | 1/2001 | Filepp et al. |
| 6,199,082 B1 | 3/2001 | Ferrel et al. |
| 6,216,177 B1 | 4/2001 | Mairs et al. |
| 6,230,171 B1 | 5/2001 | Pacifici et al. |
| 6,237,025 B1 | 5/2001 | Ludwig et al. |
| 6,285,363 B1 | 9/2001 | Mairs et al. |
| 6,308,327 B1 | 10/2001 | Liu |
| 6,351,776 B1 | 2/2002 | O'Brien et al. |
| 6,396,500 B1 | 5/2002 | Qureshi et al. |
| 6,437,776 B1 | 8/2002 | Walz |
| 6,532,218 B1 | 3/2003 | Shaffer et al. |
| 6,570,590 B1 | 5/2003 | Dubrow et al. |
| 6,598,075 B1 | 7/2003 | Ogdon et al. |
| 6,601,087 B1 | 7/2003 | Zhu et al. |
| RE38,284 E | 10/2003 | Allen et al. |
| 6,631,404 B1 | 10/2003 | Philyaw |
| 6,643,663 B1 | 11/2003 | Dabney et al. |
| 6,654,032 B1 | 11/2003 | Zhu et al. |
| 6,675,216 B1 | 1/2004 | Quatrano et al. |
| 6,684,211 B1 | 1/2004 | Nguyen |
| 6,687,878 B1 | 2/2004 | Eintracht et al. |
| 6,711,378 B2 | 3/2004 | Kashima |
| 6,728,753 B1 | 4/2004 | Parasnis et al. |
| 6,728,784 B1 | 4/2004 | Mattaway |
| 6,748,420 B1 | 6/2004 | Quatrano et al. |
| 6,778,972 B2 | 8/2004 | Leonardos |
| 6,810,382 B1 | 10/2004 | Wamsley et al. |
| 6,826,595 B1 | 11/2004 | Zhu et al. |
| 6,911,987 B1 | 6/2005 | Mairs et al. |
| 6,948,131 B1 | 9/2005 | Neven et al. |
| 7,047,241 B1 | 5/2006 | Erickson |
| 7,127,486 B1 | 10/2006 | Reistad et al. |
| 7,130,883 B2 | 10/2006 | Zhu et al. |
| 7,133,896 B2 | 11/2006 | Ogdon et al. |
| 7,143,177 B1 | 11/2006 | Johnson et al. |
| 7,203,755 B2 | 4/2007 | Zhu et al. |
| 7,240,287 B2 | 7/2007 | Qureshi et al. |
| 7,299,405 B1 | 11/2007 | Lee et al. |
| 7,328,239 B1 | 2/2008 | Berberian et al. |
| 7,373,381 B2 | 5/2008 | Rust |
| 7,461,347 B2 | 12/2008 | Zhu et al. |
| 7,490,169 B1 | 2/2009 | Ogdon |
| 7,523,163 B2 | 4/2009 | Zhu et al. |
| 7,533,146 B1 | 5/2009 | Kumar |
| 7,546,602 B2 | 6/2009 | Hejlsberg |
| 7,552,228 B2 | 6/2009 | Parasnis et al. |
| 7,558,402 B2 | 7/2009 | Zhou et al. |
| 7,590,688 B2 | 9/2009 | Franke |
| 7,669,183 B2 | 2/2010 | Bowman et al. |
| 8,204,935 B2 | 6/2012 | Vernon et al. |
| 8,473,835 B2 | 6/2013 | Hariton |
| 8,548,861 B2 | 10/2013 | Buonanno et al. |
| 8,683,328 B2 | 3/2014 | Nguyen |
| 2001/0000811 A1 | 5/2001 | May et al. |
| 2001/0030667 A1 | 10/2001 | Kelts |
| 2002/0002562 A1 | 1/2002 | Moran et al. |
| 2002/0019845 A1 | 2/2002 | Hariton |
| 2002/0053078 A1* | 5/2002 | Holtz .......... G06Q 30/06 725/14 |
| 2002/0059293 A1 | 5/2002 | Hirsch |
| 2002/0065885 A1 | 5/2002 | Buonanno et al. |
| 2002/0069099 A1 | 6/2002 | Knox et al. |
| 2002/0069405 A1 | 6/2002 | Chapin |
| 2002/0085030 A1 | 7/2002 | Ghani |
| 2002/0089470 A1 | 7/2002 | Raman |
| 2002/0112180 A1* | 8/2002 | Land .......... G06Q 10/10 726/26 |
| 2002/0120925 A1 | 8/2002 | Logan |
| 2003/0009603 A1 | 1/2003 | Ruths et al. |

(56) References Cited

U.S. PATENT DOCUMENTS

| | | |
|---|---|---|
| 2003/0011636 A1 | 1/2003 | Feroglia |
| 2003/0014513 A1 | 1/2003 | Ruths et al. |
| 2003/0018719 A1 | 1/2003 | Ruths et al. |
| 2003/0043185 A1 | 3/2003 | Kake |
| 2003/0118167 A1 | 6/2003 | Sammon et al. |
| 2003/0120593 A1* | 6/2003 | Bansal .............. G06F 17/30873 705/39 |
| 2003/0120729 A1 | 6/2003 | Kim et al. |
| 2003/0217336 A1 | 11/2003 | Gounares |
| 2003/0227479 A1* | 12/2003 | Mizrahi .................. A63F 13/10 715/753 |
| 2004/0008180 A1 | 1/2004 | Appling |
| 2004/0012613 A1 | 1/2004 | Rast |
| 2004/0030741 A1 | 2/2004 | Wolton |
| 2004/0034543 A1 | 2/2004 | Bartsch |
| 2004/0046798 A1 | 3/2004 | Alen |
| 2004/0048646 A1 | 3/2004 | Visocnik |
| 2004/0090424 A1* | 5/2004 | Hurley .................... G09G 5/00 345/169 |
| 2004/0095378 A1 | 5/2004 | Vigue et al. |
| 2005/0027896 A1 | 2/2005 | Mairs et al. |
| 2005/0050462 A1 | 3/2005 | Whittle |
| 2005/0073506 A1 | 4/2005 | Durso |
| 2005/0131924 A1 | 6/2005 | Jones |
| 2005/0216847 A1 | 9/2005 | Zhu et al. |
| 2006/0064643 A1 | 3/2006 | Hariton |
| 2007/0028177 A1 | 2/2007 | Hariton |
| 2007/0168426 A1 | 7/2007 | Ludwig et al. |
| 2008/0253608 A1 | 10/2008 | Long |
| 2011/0106716 A1 | 5/2011 | Hariton |
| 2013/0254665 A1 | 9/2013 | Hariton |

FOREIGN PATENT DOCUMENTS

| | | |
|---|---|---|
| WO | WO1997042728 A3 | 2/1998 |
| WO | WO 0062220 A1 | 10/2000 |

OTHER PUBLICATIONS

Moreau, Dennis R., "The USL NASA PC R&D Interactive Presentation Development System", National Technical Information Services (Baltimore) Report No. N8914979, pp. 1-8, Aug. 1984.

U.S. Pat. No. Re. 38,284, Allen et al.

Amir, Arnon, et al,. "Automatic Generation of Conference Video Proceedings", Journal of Visual Communication and Image Representation, vol. 15, Issue 3, Academic Press Inc., Sep. 2004.

Scott Elrod et al., Liveboard: A Large Interactive Display Supporting Group Meetings, Presentations and Remote Collaboration, May 3, 1992, Association for Computing Machinery,.

Binjia Jiao, Multimedia Presentation Database System, ACM Multimedia 2000, Nov. 2000, Los Angeles, CA.

Optical Magnetic Imaging Corporation, Interactive Presentation System User's Manual, Ver. 2.20, Jan. 1993, Optical Magnetic Imaging Corporation.

Rutledge, Patrice-Anne, "Adding Movies and Sound", Using Microsoft PowerPoint 2000, Indianapolis, Ind: Que, 1999. Chapter 13, EBSCOhost, Web. <http://ehis.ebscohost.com/.

Camarda, Bill, "Using Microsoft Word 2000", United States: Que, 1999, Chapter 24, Safari Books Online. Web. <http://techbus.safaribooksonline.com/book/office-and-productivity-applications/0789718529.

Fuller, Robert C., "Working with Web Scripts", Using Microsoft PowerPoint 2000, Indianapolis, Indiana, Que, 1999. Chapter 16, pp. 368, 381-382.

Rutledge, Patrice-Anne, "Using Online Broadcasts and Meetings", Using Microsoft PowerPoint 2000, Indianapolis, Indiana, Que, 1999. Chapter 17, pp. 384 and 404-405.

* cited by examiner

Actor

Figure 5a

Use Case

DISTRIBUTED SCRIPTING FOR PRESENTATIONS WITH TOUCH SCREEN DISPLAYS

RELATED APPLICATIONS

This application is a continuation of U.S. patent application Ser. No. 13/903,776, filed May 28, 2013, which is a continuation of U.S. patent application Ser. No. 12/554,738, filed Sep. 4, 2009 and issued as U.S. Pat. No. 8,473,835 on Jun. 25, 2013, which is a continuation of U.S. patent application Ser. No. 11/227,001, filed Sep. 14, 2005 now abandoned, which claims priority to U.S. Provisional Application No. 60/609,796 filed Sep. 14, 2004; the disclosures of which are incorporated herein by reference.

BACKGROUND OF THE INVENTION

Field of the Invention

The present invention relates generally to a method and a system for preparing and presenting multimedia presentations.

Description of the Prior Art

Figure 1:
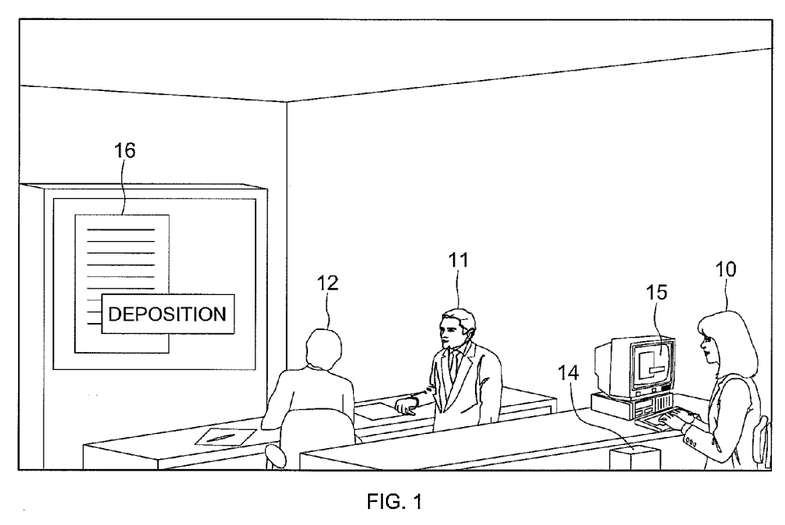
FIG. 1 is a view of a Scripting Room.

In preparing a multimedia presentation, the sources, including individuals and documents) are typically in the same physical location, called a scripting room, as the scripting technician. Within the context of a lawsuit, for example (and as shown in FIG. 1), a trial consultant or technician ("Operator" or controller or control operator), meets with one or more contributors, such as attorneys, clients, witnesses and/or experts in the Scripting Room and together they utilize multimedia software to create a scripted presentation of evidence relating to a specific witness or the opening/closing of a trial. Software for creating such a scripted presentation is disclosed in U.S. Pat. No. 5,473,744, which is incorporated herein in its entirety by reference. As an alternative, the contributors may provide the Operator with an outline of an examination, opening statement, or closing statement.

In the Scripting Room, the Control Operator creates a script corresponding to the outline. A physical scripting room as currently utilized in the art may include contributors 11 and 12 working with an Operator 10 (trial consultant or technician) to script a multimedia presentation. The Operator utilizes multimedia software and data source material on a CPU 14 and associated display monitor 15, which the contributors (and the Operator) view on a large screen display 16 linked to the Operator's CPU.

Regardless of how the scripted presentation is initiated, the contributors and the Operator still must physically meet to review the scripted presentation and work together in the Scripting Room to make final revisions to the scripted presentation. This entails synchronizing the schedules of potentially a large number of persons, and will typically involve the additional expense and effort of travel.

SUMMARY OF THE INVENTION

A live presentation may be prepared and displayed by providing a primary scripting room for preparing a presentation script and a control computer in the primary scripting computer for use by a control operator to view and/or edit possible contributions to the presentation script and for saving the presentation script being prepared. At least one remote scripting room may be connected to the primary scripting room by network to form a virtual scripting room therewith. A remote computer may be provided in the remote scripting room for operation by a contributor to provide possible contributions to the presentation script viewable by the remote operator. At least portions of the saved scripted presentation may be presented on a display computer as the live presentation.

DETAILED DESCRIPTION OF THE INVENTION

Figure 2:
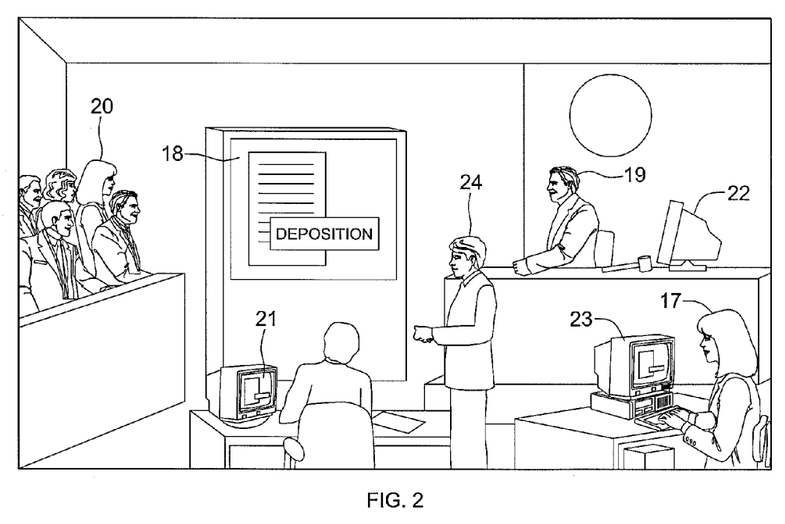
FIG. 2 is a view of a court room in which the presentation prepared in the Scripting Room is displayed.

With reference to the previous example of a scripted presentation prepared within the context of a lawsuit, FIG. 2 depicts a typical courtroom in which the scripted presentation would be displayed to enhance the effective presentation of visual evidence, including but not limited to documents, videotaped depositions, photographs, etc. and ultimately to assist the presenting attorney to control juror focus. The Control Operator 17 is utilizing multimedia software to display the scripted presentation and associated data source material from her CPU and associated hard drives at the direction of the speaking attorney 24. The scripted presentation is displayed on a conveniently positioned large screen display 18 to both the judge 19 and the jury 20. In addition, there are display devices on counsel table 21, in front of the judge 22, in front of the witness (not shown), and in front of the Operator 23.

Common terms used throughout the specification are defined as follows. A scripted presentation is a series of presentation segments that will be used during a trial. A segment is a logically grouped set of graphical components that make up a single element of a script. Using a variety of windows on the screen's real estate, a segment may integrate animation, video deposition segments, live action video, graphics, document images, text, and any other type of information that may be visually displayed. An exhibit is a collection of files that will be used for display as a single entity. For example, several TIFF files may be placed in an exhibit. A case is a unit used to identify a group of scripts. The main office refers to the physical facility where the Operator and scripting room are located.

Figure 3:
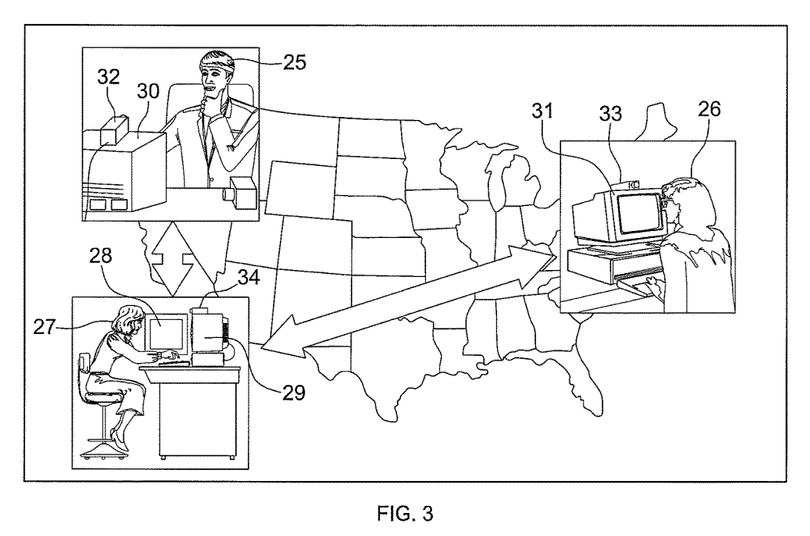
FIG. 3 is a diagram illustrating distributed scripting.

The physical Scripting Room may be replaced by a virtual one ("Virtual Scripting Room"). As shown in FIG. 3, the Operator and the scripting computer are located in the Scripting Room, while the contributors may be situated in their offices wherever located. The Operator and the contributors are in effect together in the Virtual Scripting Room connected by the Internet (or directly connected via Intranet, fiber optic cable, satellite, ISDN or other high-speed transmission line or facility). The connection may either be in real time (synchronous) or time shifted (asynchronous).

The scripting computer executes software that enables communication between the Operator and the various contributors, as well as the development of the scripted presentation itself. The interactive nature of the software facilitates time shifting and collaboration in general. Elements of the scripted presentation (video, documents, graphics and text) may be streamed between the Operator and the contributors. Each contributor has the ability to utilize the software's tools to modify existing script segments, to create new script segments, and to append comments to any scripted segment. The revisions may be stored as temporary script segments and identified by creator and revision number (example: contributor Able working on script segment 6 first revision: Segment 6A-1; second revision: 6A-2; etc.). However, only the changes made or accepted by the Operator become final in a scripted presentation. The Operator may view a single script segment, all of its renditions, and its modifications and comments simultaneously as thumbnails sized proportionally to fill the screen, and may open and activate each by a left mouse click. The Virtual Scripting Room may be equipped with video teleconferencing running on each contributor's monitor and on a second monitor for the Operator.

With further reference to FIG. 3, contributors 25 and 26 are shown working with an Operator 27 to script a multimedia presentation in the Virtual Scripting Room. In this example, contributor 25 is located in his office in the State of Washington, while contributor 26 is located in the City of New York. The Operator is located in the Los Angeles Scripting Room. Each of the CPUs of the contributors and the Operator are connected over the Internet (or directly connected via Intranet, fiber optic cable, satellite, ISDN or other high-speed transmission line). The Operator is utilizing two display devices: a monitor 28 to show script segments, suggested revisions, suggested new segments and notes from the contributors, and another monitor 29 to provide the visual image of the contributors to the Operator via video teleconferencing. The Operators' CPU includes a storage device (not shown) as is known in the art (e.g. hard drive, CD-ROM, DVD, zip drive, tape drive) for storing the presentation and any segments contributed by the contributors. The contributors are able to view the scripted segments and the work in progress on their respective display devices 30 and 31. They may also be able to view the real time image of the Operator on their display devices, when each contributor and the Operator have digital video cameras for video teleconferencing 32, 33 and 34.

All contributors may make changes to the script, but only the Operator has the ability to save the scripted presentation and thus the final authority on the form and components of the final scripted presentation. The Operator, and/or an Application Administrator, can confer such privileges upon some of the contributors. A contributor may also choose to work independently on a working copy of the scripted presentation, and may save this working copy independently of the final copy, and may further provide this working copy for review by the other contributors and/or the Operator for possible incorporation into the final scripted presentation. As the contributors make changes to the script, each contributor's actions are saved in a log for later recall and accountability.

Data source material including Image, Video, Audio, Text, CAD and Graphic Files located outside of the Scripting Room may be used. The software may enable this feature by tracking and storing in a scripted presentation the complete path, including access codes, to each data source element. Each contributor in the Virtual Scripting Room may contribute data source material either by scripting such material or providing the Operator access to such contributor's hard drives or other media storage devices (cd-rom drives, DVD drives, zip drives, optical drives, tape drives, magneto-optical drives, etc.). This feature is particularly suited to utilizing data stored in Internet based repositories, such as FTP servers or on "Internet hard drives", such as those provided by Xdrive, i-drive, and others. Of course, any storage device connected to the same network as the contributors and Operator may be used to supply data for inclusion into the scripted presentation.

Each individual component of any one segment may thus be remotely located on a different storage device. In this embodiment, the scripted presentation contains a path for each component of each segment, so that the scripted presentation is completely portable and does not rely on default paths or storage devices that must be connected to the computer upon which the scripted presentation is being executed (such as a computer in the court room). Thus, data supplied by the contributors for inclusion into the scripted presentation may be transferred to the scripting computer for local storage together with the scripted presentation, and upon displaying the presentation, the data is available locally on the same computer as the scripted presentation. Alternatively, the data may be transferred 'on-the-fly' from the original source when displaying the presentation, without the need of first saving the data on the computer on which the scripted presentation is being executed. This feature offers additional flexibility in incorporating last-minute changes in the presentation while actually displaying the presentation, and eliminates the need for downloading and locally storing all data that may possibly be required during the presentation.

Figure 4:
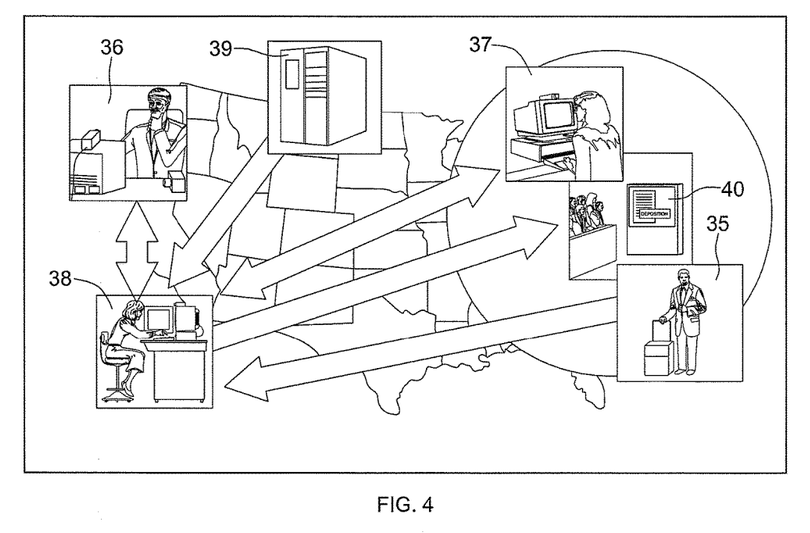
FIG. 4 is another diagram illustrating distributed scripting.

Trial presentation services may be provided from a single main office to contributors nationwide and worldwide. The delivery of worldwide services may be further facilitated by the use of regional service providers (each a "Local Provider") as depicted in FIG. 4. Each Local Provider may not only provide local support, but may also source regional litigation clients. Typically, Local Providers would be litigation photocopy companies with the ability to scan and create document images, but could be any type of litigation support entity, including court reporters. Digital video and other graphics may be created regionally or in the main office. The Local Provider would gather the source data and provide it to the main office either physically or electronically. The Local Provider may also provide contributors with a remote scripting facility linked over the Internet to the Virtual Scripting Room in the main office. In an alternative embodiment, regional attorney contributors would work with a Trial Consultant/Technician Operator in the main office from their own computers, connecting via the Internet to the Virtual Scripting Room.

Because the software will have communication capability, remote users could monitor the preparation of the scripted presentation via Web browsers such as Internet Explorer or Netscape by logging on to a web site, optionally entering a password, and viewing the scripted presentation as the Operator and contributors build it and edit it.

Once Scripting has been completed, a Trial Consultant could provide in-court presentation services. The role of the Trial Consultant can be a function of the ability of the software to: (i) create software rather than graphic based "slides" prior to trial containing segments of video, documents and/or graphics; (ii) order the "slides" into a scripted presentation paralleling the attorney's examination outline; and (iii) as a result of the "slides" being maintained as a software matrix rather than as a single graphic file, modify existing "slides", randomly access and display any slide within a scripted presentation, and incorporate new or revised animations, video deposition segments, live action video, graphics, and document images during trial. The Trial Consultant may also assist in the analysis of evidentiary issues arising in connection with the multimedia presentation of evidence both as a sword (how far to go) and as a shield (when to object to the other side's use of evidence).

In some cases, the regional attorney contributors or personnel provided by the Local Provider could do the in-court presentation of scripts. In this scenario, the main office could provide daily supplemental Scripting and support either through a Virtual Scripting Room, or by the now on-site Trial Consultant.

FIG. 4 depicts the use of Distributed Scripting with the assistance of a Local Provider 35 to provide multimedia support services to a trial team in a remote location. The contributors 36 and 37 are working with an Operator 38 (trial consultant or technician) to script a multimedia presentation in the Virtual Scripting Room. Once again, contributor 36, perhaps an expert, is located in his office in the State of Washington, while contributor 37 is located in the City of New York. The Operator is located in the Los Angeles Scripting Room. Each of the CPUs of the contributors, and perhaps the Local Provider, and the Operator are connected over the Internet (or directly connected via Intranet, fiber optic cable, satellite, ISDN or other high-speed transmission line or facility).

As in FIG. 3, the Operator 38 is utilizing two display devices: a monitor to show script segments, suggested revisions, suggested new segments and notes from the contributors, and another monitor to provide the visual image of the contributors to the Operator via video Teleconferencing. The contributors are able to view the scripted segments and the work in progress on associated display devices. The Local Provider may act to gather the source data and provide it to the main office either physically or electronically. The Operator is utilizing multimedia software to display a scripted presentation and associated data source material from not only her CPU and associated hard drives, but may also utilize remote storage devices 39 such as Internet hard drives. The scripted presentation and other visual evidence will be displayed to the trier of fact located in a remote courtroom 40, by an in-court Operator 37, by the speaking attorney 35, by the Local Provider (not shown), or even by an Operator 38 located in the main office. Most typically, the main office Operator 38 will electronically transfer a compressed scripted presentation and underlying data source material to the in-court Operator 37. For a remote Operator to present evidence in the courtroom, or an Operator located in a courtroom to pull scripted source data from remote hard drives, the courtroom must have telecommunication facilities such as access to the Internet. Alternatively, remote telecommunication devices such as cellular telephones may be used to access the Internet or other communication network.

The communications capability of the software may also permit the broadcast of the presentation over the network (e.g. the Internet) as the presentation is made in court. Thus, attorneys located remotely may track the presentation; the presentation may also be provided to a news service such as CNN for live TV broadcast. The software may also be compatible with Web browsers such as Microsoft Internet Explorer and Netscape, and allow the presentation to be viewed by remote users accessing the Internet through such browsers.

Software

Figure 5A:
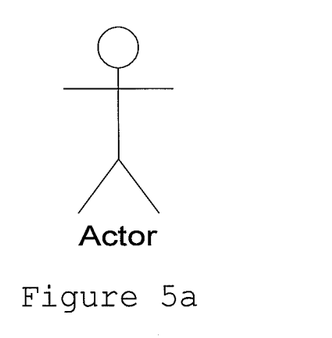
FIGS. 5a, 5b and 5c represent various system functionality components.

The following subsection presents in greater detail a model of the system functionality as may be implemented in a software embodiment. The graphical depictions in this subsection are Use Case diagrams. Use Case diagrams map each user role to the tasks associated with that role and the key software components that service those tasks. They are composed using the following symbols:

Actor—an Actor represents anyone or anything that interacts with the system. An actor is a stick figure; see FIG. 5a.

Figure 5B:
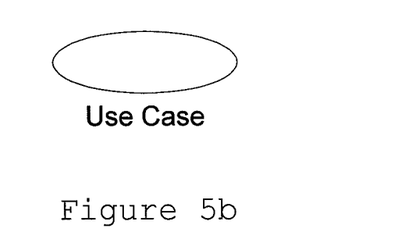

Use Case—a Use Case represents a task or task grouping that the system performs. A Use Case is represented by an oval with text inside describing the task (Edit List) or a group of tasks (List Manager); see FIG. 5b.

Figure 5C:
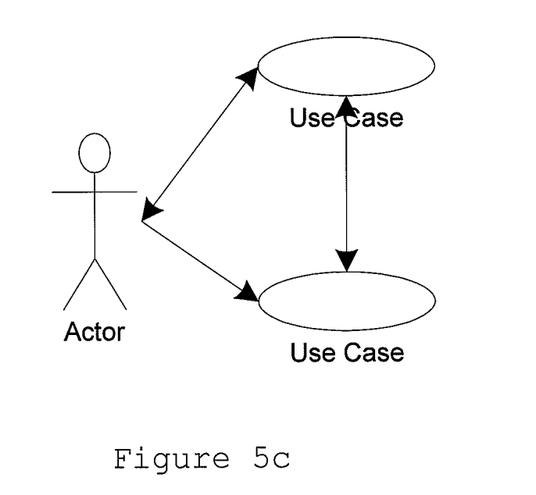

Relationship—A Relationship provides information about how Actors and Use Cases interact with each other. They are depicted as lines with arrowheads. A line with an arrowhead on each end indicates a 2-way communication. A line with an arrowhead on one end indicates that one diagram object is using the one that is pointed to by the arrow; see FIG. 5c.

A common misunderstanding is not differentiating a person's responsibilities from the roles they play in the business. In some businesses, for example, the database administrator, system administrator, and application administrator are different individuals, each of whom has only one role. However, other businesses have a single individual who is responsible for more than one role. Combining the database administrator and application administrator is common, for instance. For a system to be flexible enough to accommodate these differences in operating styles, it should be designed with the assumption that a single individual can perform one or more roles in the system.

Figure 6:
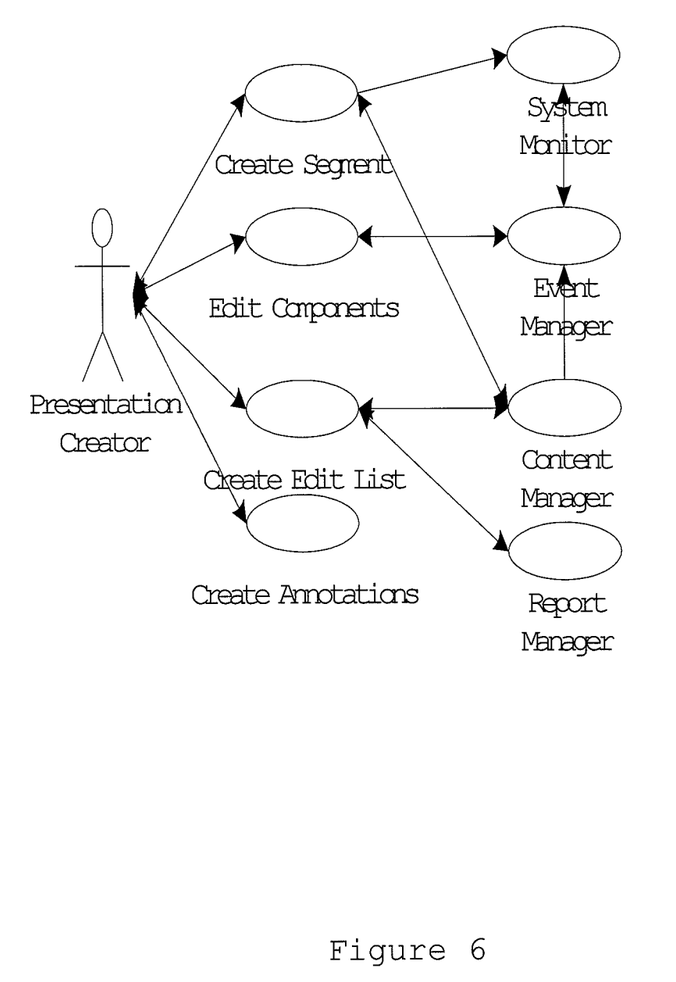
FIG. 6 is a diagram of functions that may be performed by a Presentation Creator.
Figure 7:
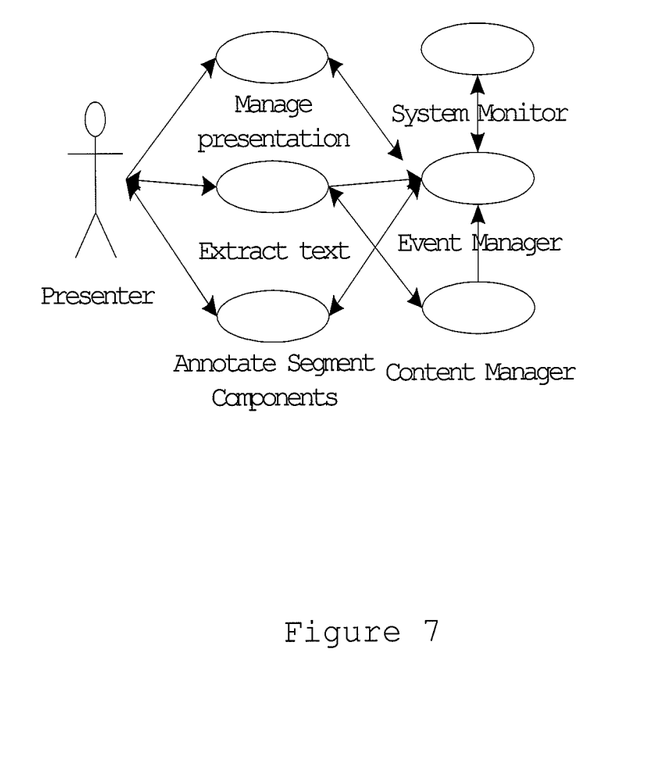
FIG. 7 is a diagram of functions that may be performed by a Presenter.
Figure 8:
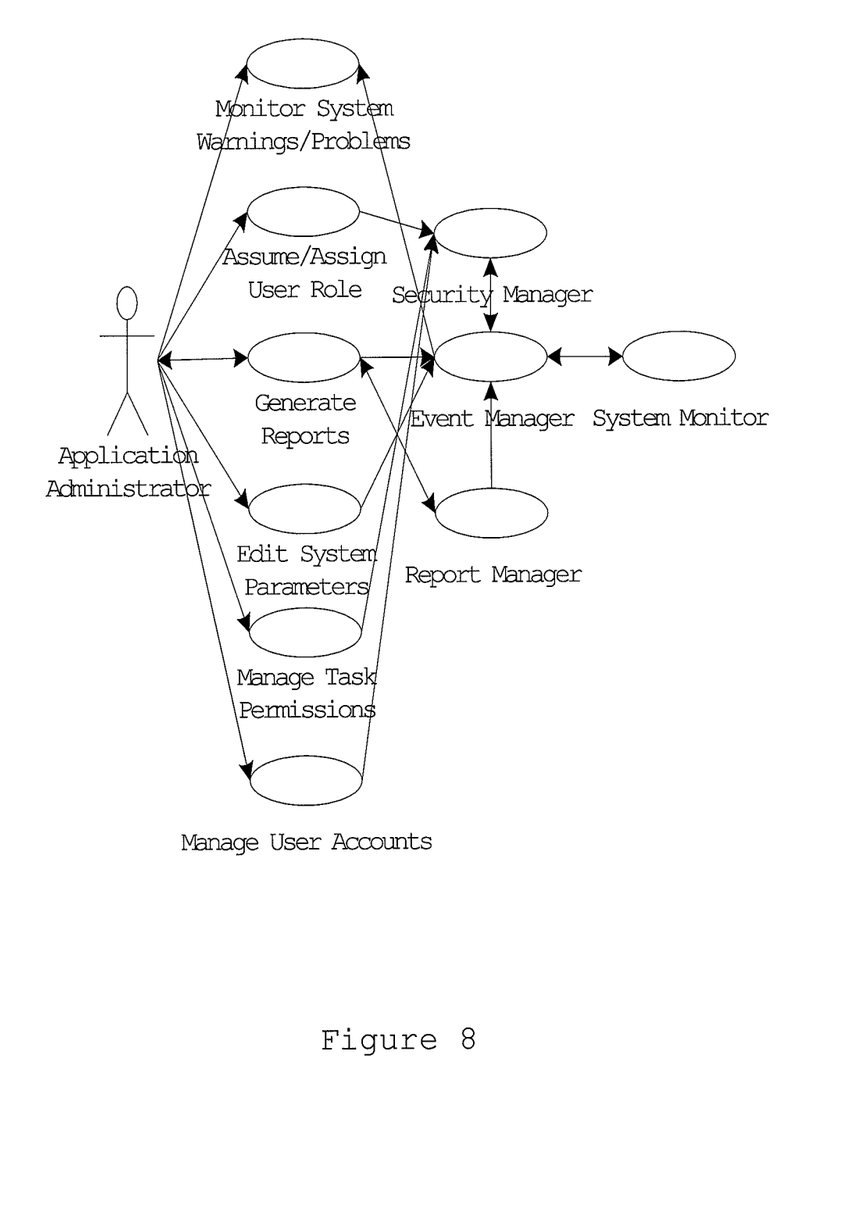
FIG. 8 is a diagram of functions that may be performed by an Application Administrator.

The Presentation Creator typically builds the multimedia presentation from components like documents, audio recording, video recording, animations, and pictures, as shown in FIG. 6. The Presenter manages the presentation for the lawyer. Usually the Presentation Creator and the Presenter are the same person, as depicted in FIG. 7. The Application Administrator handles all technical tasks required to install, operate, and fix the application. In order to perform these tasks, in particular the problem resolution tasks, they can temporarily assume any role in the system, as shown in FIG. 8.

Functional Requirements

This subsection describes the functions in a preferred software implementation of the system.

The text in a document may be extracted into separate (child) windows ("child" refers to client nomenclature, not object-oriented nomenclature).

The text in a window may be enlarged or diminished in 2-point increments using one button.

The text in a window may be highlighted in color.

The text in a window may be highlighted and underlined in separate colors.

The text in a window may be selected and circled or boxed using precise drawing elements like circles and rectangles.

The text in a window may be selected and marked in the following ways:
strikethrough
highlight
underline The text in a window may selectively be marked by graphical elements like checkmarks and bullets.

The text in a window may selectively be obscured from view.

Freehand drawing may be performed on a text window.

Text may be selected and highlighted while all other text is changed to a different color, for instance, grayed out.

Individual text highlighting may be "undone" or removed without affecting other highlighted text.

Individual text formats like strikethrough, etc. may be "undone" or removed without affecting other text formats.

Individual text edits that obscure text may be "undone" or removed without affecting other obscured (or redacted) text.

Each text edit may be individually removed or undone.

All text highlighting on a segment may be removed with one action.

Individual documents in a segment containing multiple documents may be brought to front with a single keystroke and/or mouse action (mouse roller wheel selection). Repeating the keystroke and/or mouse action may cycle through each document, raising it to the front in turn.

Documents in a segment may be expanded to full screen.

The system may allow the user to page forward and backwards through the document a page at a time. In addition, there may be a way provided to jump to the beginning and end of the document. Finally, there may be a method to jump to a specific page number.

Documents may be rotated by 90 degree angles.

Subsections of pictures may be selected (either with an oval or rectangle) and highlighted.

Subsections of pictures may be selected (either with an oval, or rectangle) and turned opaque.

Subsections of pictures may be selected (either with an oval, or rectangle), extracted into a separate window and blown up.

A picture subsection window may be incrementally magnified or diminished with a single button, one for magnifying and one for decreasing the size of the subsection.

Freehand drawing may be performed on a graphic window.

Pictures in a segment may be expanded to full screen.

Subsections of video may be selected (either with a circle, or rectangle) and highlighted.

Subsections of video may be selected (either with a circle, or rectangle) and extracted and enlarged as a still picture into a separate window.

A video recording may be slowed and sped up incrementally using single user actions for each.

A video recording may be slowed to a stop and then advanced one frame at a time.

When a video recording is being advanced one frame at a time, the full still picture may be captured and extracted to a separate window.

The volume may be controlled on a per video basis. The volume may be set during segment building and controlled during presentation.

The volume may be modulated for a minimum and maximum volume. For instance, a sound below the minimum may be increased to the minimum and a sound above the maximum may be reduced the maximum.

Multiple marks may be created in a video recording.

A repeating loop may be run between video recording marks.

The video may be set to run to a mark and pause until some action is taken that runs it to the next mark.

The video recording may be caused to rewind or fast forward and automatically stop on the first encountered mark.

A video recording(s) may be synchronized with positions in a document(s). That is, when the user clicks a particular section of the document (transcript), the video jumps to the synchronized position in the video recording and vice versa.

A video recording may be synchronized with other video recordings. That is, when the user re-positions in one video, it causes the synchronized video to automatically re-position and stay in sync.

Freehand drawing may be performed on a video window.

Video in a segment may be expanded to full screen.

Full video controls may be provided, similar to those found on a VCR.

A segment or set of segments may be cut and pasted into a different script.

Annotations may be created and attached to any segment component.

Segment may be saved using a single action like a keystroke, button, or mouse click.

A script may be merged with another script.

A script may be copied to another script.

A set of segments may be re-ordered in a script.

A set of segments may be extracted and saved as a script.

Each segment may have an identification reflecting its order in the script.

A "hot save" function for saving a segment along with or without its association may be provided. For example, it would be named "HS3_filename".

The "hot save" function may put the saved segment at the end of the segment list in script.

Elements that are not part of the script or segment may be added to the presentation and worked in. File select needs to be unobtrusive.

Saving process in script mode may include a hot key to save all segments and the script.

Full segment edit capabilities may be provided in presentation mode.

Segments may be shown in script order or select and display on the fly.

A small segment identification may be shown on screen for the current segment.

While playing video, the system may provide the ability to have scripted documents show up at specific, timed points in the video.

The system may allow the user to create document scrolling in synchronization with video.

The system may print scripts.

The system may print individual or selected or all segments.

The system may print a slide show format of the segments in a script (proof sheet).

The system may print a slide show w/barcodes (proof sheet w/barcodes).

The system may print segment components.

The system may print a segment description-barcode cross-reference.

The system may print a barcode-file name cross-reference within a specified directory.

The user can select which files will be included in the cross-reference.

Saving a segment containing multiple elements may retain the dominance (i.e. which document is in front) seen on the screen.

An element's size may be set individually within a segment.

The software may be able to interface with a wide variety of other software, e.g. word processors (MICROSOFT WORD word processing software, WORDPERFECT word processing software, etc.), presentation software (POWER POINT presentation software, etc.), databases (by ORACLE, DBASE, etc.), case management software (SUMMATION, etc.), video preparation and editing software (e.g. QUICKTIME), image preparation and editing software (e.g. PHOTOSHOP), and others. The software may convert certain files into a preferred format (e.g. convert all MICROSOFT WORD files into RTF format) and save them in this preferred format. However, the software may also be able to read and display any format on-the-fly.

This function will enable the Presenter to incorporate new components into segment at a moment's notice even if the new components are located remotely and are not available on the CPU running the scripted presentation in court. In this manner, the Presenter may be able to access new information located anywhere in the world, provided that the information is accessible remotely (e.g. stored on servers connected to the Internet), and incorporate the information into the presentation scripted presentation as may be required by new and unanticipated developments.

Potential Uses and Markets

Other services may be provided in addition to the in-court presentation of evidence. Such additional services may be further aided by the addition of two supplemental software features, as described below.

1) Interactive Text Objects

This feature may take the form of an utility that permits a form or other text document to be treated as a scripting object in a fashion similar to other data source material, with the exception that the Operator may at any time add text to the form and save both the form and the new text in a script segment together with other objects (graphics, photographs, etc.). This utility may be used in the medical and insurance fields, for instance, where a physician in a medical testing facility could in the course of evaluating an Ultra Sound or NMR image complete an electronic medical evaluation/diagnosis form and script the image and completed form together in a single script segment. In this situation, the scripted presentation represents a patient's medical file rather than a witness examination. The patient scripted presentation could be maintained by the main office in the role of the Operator, while the testing facility physician, the treating physician, the specialist (surgeon) and the hospital would each have the role of a contributor. The resulting scripted presentation may be transmitted to other facilities for viewing, diagnosis, patient treatment, or for billing and insurance reimbursement.

2) Distributed Presentation

Ultimately a scripted presentation, whether created in a physical or virtual scripting room, may be presented either: (a) to an audience physically in the presence of the Operator, as in the case of a jury in a courtroom where a lawyer is presenting evidence with assistance of an Operator; or (b) to an audience connected to the Operator over the Internet (or directly connected via Intranet, fiber optic cable, satellite, ISDN or other transmission line; "Distributed Presentation"), as in the case of Internet based marketing—e.g. the VICTORIA'S SECRET brand fashion shows, GENERAL MOTORS CORPORATION introduction of new car models, or the latest MICROSOFT CORPORATION software introduction. The audience may be a single individual, a group of individuals sitting together or a geographically distributed group located throughout the world.

Each of the following examples may utilize Distributed Scripting and/or Distributed Presentation.

Insurance Claim Processing and Reimbursement—The scripted presentation is the claim file; the contributors are the claim adjuster, the investigators, repair or replacement sources, the claims manager and the payer; the Operator is either the Insurance Company or the main office.

Medical Diagnostic and Payment—The scripted presentation is the patient file; the contributors are the testing facility physician, the treating physician, the specialist (surgeon), the hospital and ultimately-the insurer; the Operator is the main office.

Corporate Presentations and Marketing—The scripted presentation is the presentation topic; the contributors are the internal team members responsible for the project, external consultants and in some cases the audience; the Operator is the corporation.

Development of Corporate Collateral and Marketing—The scripted presentation is the assemblage of the corporate collateral being created; the contributors are the in-house marketing personnel, the in-house executive in charge of the project, the senior executive who ultimately approves the project, the external marketing/advertising executive in charge of the project, the graphic designers; the Operator is either the corporation or the marketing entity.

Advertising Graphic Development and Delivery—The scripted presentation is the advertising campaign being created; the contributors are the in-house marketing personnel, the in-house executive in charge of the project, the senior executive who ultimately approves the project, the external advertising executive in charge of the project, the graphic designers and other team members; the Operator is the advertising company.

Corporate Road Shows—The scripted presentation is the offering materials, company history and prospects; the contributors are the senior management of the corporation, the auditors, the investment bankers and attorneys; the Operator is either the lead investment bank or the main office.

Internet Conferencing—The scripted presentation is the presentation topic; the contributors are the internal team members responsible for the project, external consultants and in some cases the audience; the Operator is either the Web hosting corporation, or the main office.

Project Development and Oversight: Architecture, Construction and Finance—The scripted presentation is the project, including the development contract, the finance contract, and the plans, progress reports and testing; the contributors are the financing entity, the architects, subcontractors, the general contractor and inspectors; the Operator is the owner/buyer.

Banking: Finance Packages and Loan Processing—The scripted presentation is the borrower and the loan package; the contributors are the borrower, the loan officer, the approval committee; the Operator is the bank or lending institution.

Aircraft, Satellite and Space Craft Construction Management and Reporting—The scripted presentation is the individual aircraft, satellite or space craft, including the development contract, the finance contract, and the plans, progress reports and testing; the contributors are the financing entity, the architects, subcontractors, the manufacturer, the construction managers, safety inspectors and regulatory agencies; the Operator is the owner/buyer.

Shipbuilding—The scripted presentation is the vessel, including the construction contract, the finance contract, and the plans, progress reports and testing; the contributors are the financing entity, the architects, subcontractors, the builder, the project manager, safety inspectors and certification societies; the Operator is the owner/buyer.

Focus Group Results—The scripted presentation is the research results, statistical charts and conclusions; the contributors are the researcher and/or the facilitator, the entity paying for the study; the audience are the financial backers of the study, the studio executives, in the case of a movie, the product line executives, in the case of a new product release; the Operator is either the entity putting on the research or the main office.

Focus Group Results: Litigation—The scripted presentation is the research results, statistical charts, case themes and conclusions; the contributors are the jury consultant, the facilitator, the attorneys on the trial team involved in the litigation; the audience are the trial team members, the client party to the litigation and/or the client representative; the Operator is either the jury consulting firm or the main office.

Figure 9:
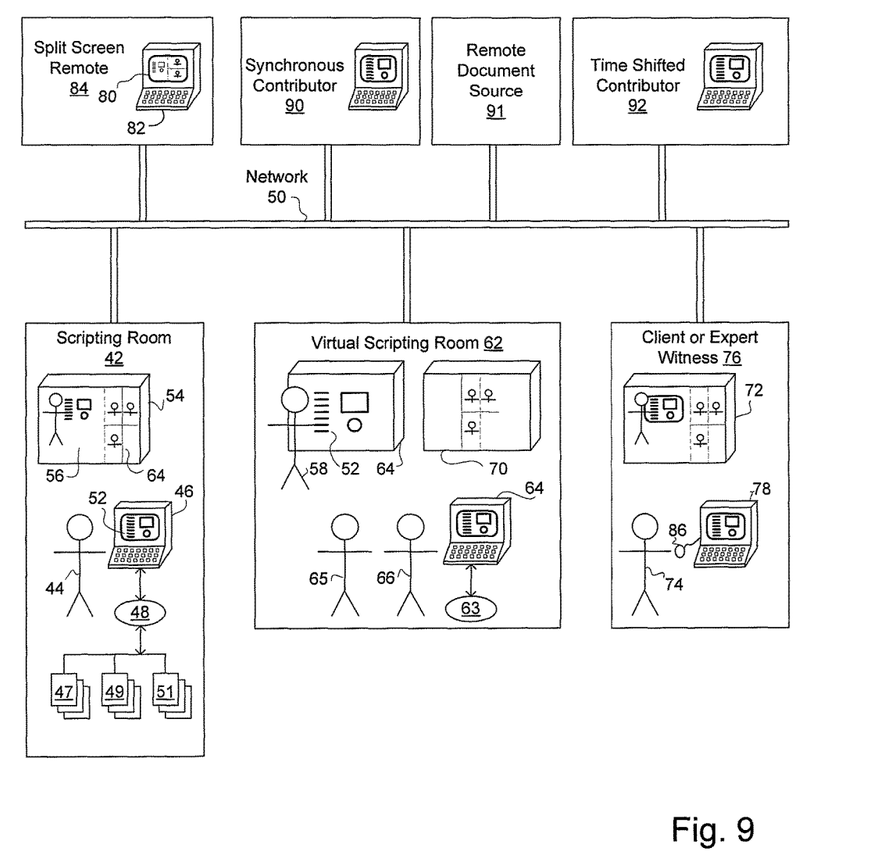
FIG. 9 is a sketch of a scripting facility including a virtual scripting facility with a touch screen display.

Referring now to FIG. 9, scripting room 42 is the physical room in which control operator 44, using scripting computer 46, accepts, rejects and or modifies script contributions made by various contributors, located either in scripting room 42 or in various remote locations as described below. The scripted presentation may be stored in whole or in part in storage device 48 connected to scripting computer 46 or in whole or in part in devices at other locations connected to scripting room 42 via network 50, including, for example, the Internet.

In particular, the script or outline Script 52 for the scripted presentation is stored in storage device 48 of scripting computer 46 and provides at a minimum the order in which documents or other materials to be displayed are scheduled for display during the scripted presentation. This order may be modified during the presentation of the scripted presentation in accordance with information made available during the presentation.

For example, as shown below with regard to court room 76 in FIG. 10, control operator 44 may modify the order in which the documents or other materials to be displayed are displayed during the scripted presentation in accordance with instructions from trial counsel who may be presenter 94 or may be watching the judge or jury during a portion of the scripted presentation being presented by a witness acting as presenter 94.

Some of the documents or other information to be displayed, such as documents 51, may also be stored in storage device 48 of scripting computer 46 together with the script. In addition, links to other documents or information to be displayed during the presentation of the scripted presented, such as links 49, may be stored in storage device 48. Links 49 are used by scripting computer 96 to gain access, via network 50 for example, to documents or other information to be displayed which are stored on a computer related to a remote contributor, such as documents 63 stored on virtual scripting room computer 64 in virtual scripting room 64.

Further, links 47 may be stored in storage device 48 for access via network 50 to documents or other information to be displayed which are stored on other remote sources, such as remote document source 91.

Scripted presentation 52 may be displayed on scripting computer 46 while large screen display 54 may display teleconferenced image 56 of presenter 58, in front of 2.sup.nd large screen display 60, in virtual scripting room 62. Large screen display 54 may also display teleconferenced images 64 of various other contributors as discussed below.

For example, virtual scripting room 62 may also include contributor 66 as well as contributor 66 working on virtual scripting room computer 68. Contributors 65 and 66 may therefore be included within teleconferenced images 64 displayed in scripting room 42. Virtual scripting room 62 may also include teleconference display 70 showing teleconferenced images of the contributors not present in virtual scripting room 62 as well as control operator 44.

Script 52 for the scripted presentation may be displayed on virtual scripting room computer 68 for comment, modification or whole or partial replacement by contributors 58, 65 and/or 66 and forwarded to scripting room 42 via network 50. It is important to note that the final version of the scripted presentation, which resides in storage device 48 attached to scripting computer 46 or elsewhere attached to network 50, is under the control of control operator 44. That is, proposed contributions from contributors, although they may be visible to other contributors, do not become part of the final scripted presentation until accepted and saved by control operator 44, usually in response to approval by lead trial counsel.

In a preferred embodiment, large screen display 60 in virtual scripting room 62 may advantageously be a touch screen display or may be modified to be a touch screen display. Pi$^T$ Touch Screen Bezels are available from Large Screen Displays of Santa Ana, Calif. which may be added to various large screen displays so that a touch of the screen emulates the clicking, dragging, double-clicking and right clicking operations of a mouse attached to the computer driving the display.

The use of a touch screen version of large screen display 60 advantageously provides interaction between contributor 58 who may be a presenting attorney or witness and scripted presentation 52. Although the interaction may be used by contributor 58 to provide a contribution to the scripted presentation, a far more advantageous use of the touch screen capabilities of large screen display 60 may be to permit contributor 58 to practice the formal presentation to be provided in court, as shown below with regard to FIG. 10.

Figure 10:
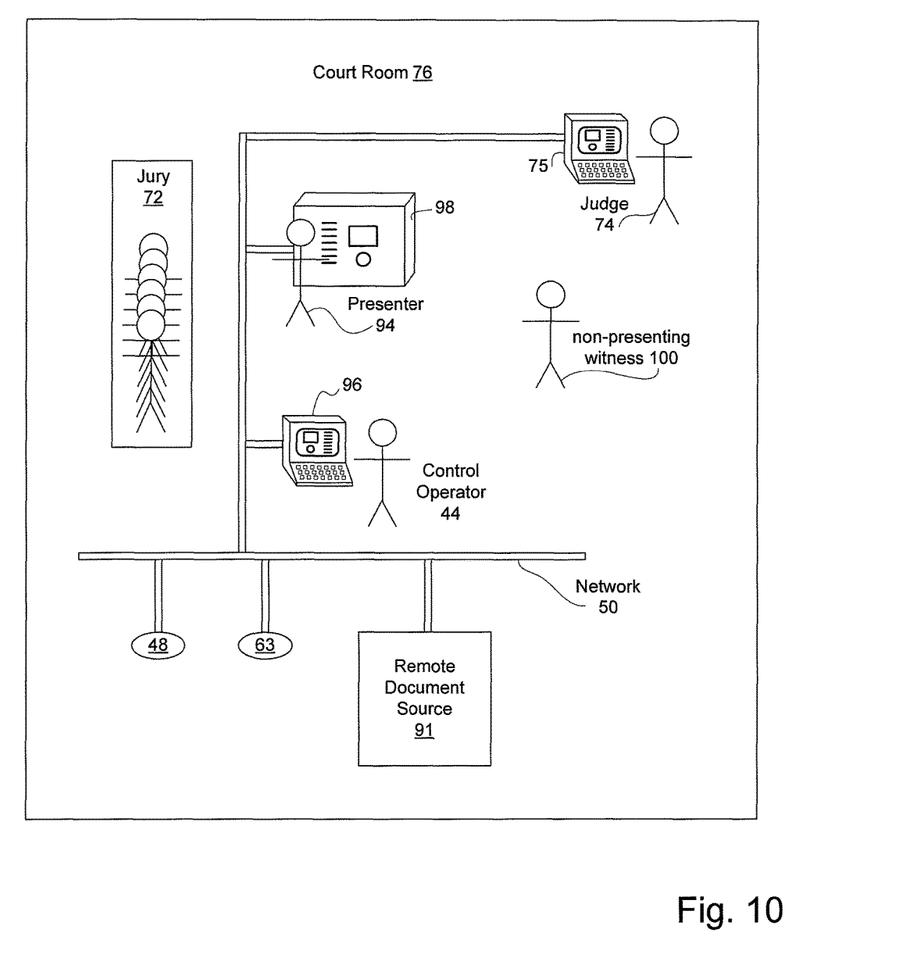
FIG. 10 is a sketch of a Court Room in which the presentation script is presented with a touch screen display.

Contributor 58 may, for example, touch various parts of the scripted presentation displayed on display 60 in order to make the presentation in the order scripted and or to touch parts of the display in response to questions or reactions from observers, such as jury 72 or judge 74 in court room 76 shown in FIG. 10. A judge, for example, may ask about the detailed background of an exhibit included in the scripted presentation and by touching the exhibit, presenter 58 may be able to display the requested background materials. Similarly, the presenter's interaction with witnesses, on direct or cross examination, may be dramatically enhanced especially in complex trials by timely display of relevant matter in response to his touch.

In particular, part of the scripting of the presentation may the interaction between presenter 58 and touch screen display 60. For this reason, it is advantageous to have this interaction visible during creation and rehearsals of the presentation to more than just the contributors then present in virtual screening room 62. For example, as shown in FIG. 9, the image of presenter 58 interacting with scripted presentation image 52 on touch screen display 60, is provided via teleconferencing over network 50, or other convenient facility, for display as teleconferenced image 56 on large screen display 54 in scripting room 42 for viewing by control operator 44.

Similarly, teleconferencing image 56 may also be provided for display on large screen display 72 by contributor 74 in remote location 76. If contributor 74 is another attorney, such as in-house counsel for a corporate litigant, or an expert witness, during a synchronous connection between virtual scripting room 62 and remote location 76, contributor 74 may both provide contributions to the scripted presentation via remote location computer 78 as well as comments and contributions related to the interaction between presenter 58 and touch screen display 60 in virtual scripting room.

In addition, it may be advantageous to use a touch screen system, as noted above, as part of large screen display 72 so that remote location 76 becomes another virtual scripting room operating in parallel with virtual scripting room 62. For example, after observing an interaction between presenter 52 and display 60, contributor 74 may propose an alternate way of doing that interaction by interacting with touch screen display 72.

Notes concerning the possible methods of interacting with the scripted presentation by any contributor and/or control operator 44 may be submitted as contributions and controlled in the same manner as other contributions. That is, in one embodiment control operator 44 may save the selected interaction notes as part of script 51 at his own discretion or upon approval by lead trial counsel who could be any of the contributors whether or not then present. Similarly, authorization by control operator 44 could be given so that contributors 58 or 74 could enter final contributions into the final script, again typically upon approval of lead trial counsel who could be contributor 58 or 72 or another.

The displays in virtual scripting room 62 may both be large screen displays, although only display 60 need be a touch screen display if that facility is desired. Display 70 may be a convenient sized, separate display showing teleconferenced images of other contributors. An alternate approach, as shown in scripting room 42 as well as in remote location 76, is that large screen displays 64 and 72 may be set up in a split screen format so that the script, and/or the presenter's interaction with the script, is shown on one portion of the large screen display while teleconferenced images of contributors in other locations could be displayed.

A still further arrangement may include a split screen display showing both the scripted presentation and teleconference images on a normal sized display, such as computer monitor 80 of remote scripting computer 82 in remote split screen facility 84. A split screen display attached to a scripting monitor may conveniently be configured to permit the use to select a portion of the split screen display, such as the scripted performance, or one or more of the teleconferenced images of other contributors, to fill the display. A return function to return to the full display should also be provided.

Advantageously, computer 80 may also be a touch screen display so that the shift from split screen display to full screen display of a portion of the split screen, and return, may be accomplished by the operator simply by touching touch screen monitor 80.

Similarly, in client or expert witness facility 76, in the absence of a touch screen large scale display, the shift from split screen display to full screen display of a portion of the split screen, and return, may be accomplished by contributor 74 interacting with scripting computer 78 by, for example, operating a device attached thereto such as mouse 86 or keyboard 88.

Referring now to synchronous collaborator 90, it should be noted that the collaborative nature of presentation scripting activities, exemplified by trial presentation preparation, strongly benefits from synchronous contributions from the various contributors. That is, the contributors typically synchronously propose changes to any part of the script during teleconferenced discussions in order to benefit from discussions among them about the portion of the script being changed.

The control operator, under the authority perhaps of a lead presenter such as lead trial counsel, then selects and/or edits the contribution finally selected to be included in the final scripted presentation to be actually presented. As a result, the final presentation includes not only contributions in each portion of the scripted presentation from all contributors who elected to contribute but also the combined wisdom of all contributors who elected to comment on the contributions to that portion. That is, the inputs provided by synchronous contributors are made interactively during discussions with other contributors so that the reactions and comments and preferences of all synchronous contributors can be combined or at least considered before control operator 44 saves any particular contribution to the final script.

However, it may be necessary to permit time shifted or asynchronous contributions to be considered, for example for time shifted contributor 92, as a result of other exigencies such as the difference in local time between contributors. Contributions proposed by time shifted contributor 92 may then be advantageously synchronously discussed and evaluated by other contributors before control operator 44 saves the final scripted presentation.

Referring now to FIG. 10, the final scripted presentation for litigation embodiments is typically presented in court room 76 by presenting attorney or witness 94 in front of judge 74 and jury 72, if present. Control operator 44 may advantageously be present in court room 76 and may operate scripting computer 96 (which may have generally the same functions as scripting 46 shown in FIG. 9), to make changes to the actual presentation during the presentation, typically in response to instructions from presenter 94. For example, during cross examination of a hostile witness, presenter 94 may choose to use a portion of the scripted presentation out of the order in which the scripted presentation has been saved, and/or use a portion of the scripted presentation not scripted to be presented unless requested. One example of a portion of the scripted presentation selected to be displayed out of the order in which it was scripted, or a portion not scripted to be presented unless requested, may further detail about the background or dating of a document being presented.

In any event, control operator 44 may cause portions of the scripted presentation to be displayed on large screen display 98 during trial in court room 76 as a result of input received during the final presentation from judge 74, jury 76 and presenting attorney or witness 98 and/or non-presenting witness 100. A separate display, such as judicial computer 75 may be made available for viewing by judge 74. Large screen display 98 may advantageously be, or be modified to be, a touch screen display so that presenter 94 may also change the order the displays of the scripted presentation or even cause the display of a portion of the scripted presentation to be displayed only if requested. In this embodiment, some or all of the functions of control operator 44 in court room 76 may be supplanted, or at least enhanced, by interaction of presenter 94 with touch screen display 98.

Touch screen display 98, and judicial computer 75 may be connected by network 50 to scripting computer 96 and, if desired, to other displays not shown for use by jury 72 and/or others. The script for the scripted presentation, including documents and/or links may be stored in scripting computer 96 and/or made available to scripting computer 96 via network 50. Similarly, some of the documents or other information to be displayed may also be made accessible to scripting computer 96 via network 50 from remote subscribers via storage device 60 and/or from remote document source 91.

It may be particularly convenient in some applications, for example when documents or other information to be displayed is made available on the Internet, or other such remote portion of network 50, to prepare and store the script for the scripted presentation in the form of HTML codes as are used for website.

What is claimed is:

1. A method for collaboratively preparing and presenting a presentation, said method comprising:
    configuring a computer for use by a control operator to view and manage proposed synchronous contributions by on-line contributors to a presentation script and for saving the presentation script being prepared;
    structuring the presentation script as a series of segments, each of which segments includes one or more elements;
    accessing at least one of the elements remotely through the Internet;
    saving the presentation script on the computer responsive to an interaction with the control operator; and
    after preparing and saving the presentation script, presenting at least portions of the saved scripted presentation to a presentation audience.

2. The method of claim 1 wherein presenting the saved scripted presentation includes streaming at least one element of one segment through the Internet without storing the streamed element on said computer.

3. The method of claim 1 wherein saving saves the multimedia script on an Internet hard drive.

4. The method of claim 1, further comprising:
    maintaining each script segment of the saved presentation script as a software matrix.

5. The method of claim 1 wherein presenting includes broadcasting to a television audience.

6. The method of claim 1 wherein presenting includes broadcasting to an Internet audience.

7. The method of claim 1 wherein presenting includes transferring at least the presented portions of the saved scripted presentation via the Internet, fiber optic cable, satellite, ISDN or other high speed transmission line or facility.

8. The method of claim 1 further comprising displaying the multimedia presentation to an audience over the Internet on a remote telecommunications device.

9. The method of claim 1 wherein presenting includes using a touchscreen to display the presentation script.

10. The method of claim 9 further comprising:
    displaying child windows of the scripted presentation on the touchscreen in response to touch interaction by a presenter during the presentation.

11. The method of claim 1 wherein at least some contributors are simultaneously enabled to edit the draft multimedia script.

12. The method of claim 1 wherein each contributor is enabled to modify existing slides, create new slides and append comments to any scripted segment.

13. The method of claim 1 including incorporating a form as a data source element of a given software based slide, saving the form as part of the given software based slide and subsequently adding text to the form and, thereafter, again saving the given software based segment.

14. The method of claim 1 further comprising accepting concurrent contributions to the revised multimedia script from a plurality of contributors with at least one contributor at a different physical location.

15. The method of claim 1 including accessing the underlying data on-the-fly without opening another software application that is associated with the underlying data.

16. The method of claim 1 including associating a complete path to the data source element.

17. The method of claim 16 wherein associating includes storing no more than the complete path for tracking the data source element.

18. The method of claim 1 including displaying proposed revisions of the draft multimedia script and storing the proposed revisions within the draft multimedia script as temporary script segments.

19. The method of claim 18 wherein storing the proposed revisions includes identifying each proposed revision with a creator and revision number.

20. The method of claim 1 including displaying contributor comments on the draft multimedia script and storing the comments within the draft multimedia script.

21. The method of claim 1 further comprising accepting asynchronous contributions to the revised multimedia script from at least one contributor.

22. A method for collaboratively preparing, and presenting a multimedia presentation, said method comprising:
    configuring a computer for use by a control operator to view and manage proposed synchronous contributions by remote on-line contributors to a presentation script and for saving the presentation script being prepared;
    structuring the presentation script as a series of slides, each of which slides contains one or more elements;
    saving the presentation script responsive to an interaction with the control operator of the computer;
    maintaining each of the script slides of the saved presentation script as a software matrix; and
    after preparing and saving the presentation script, presenting at least portions of the saved scripted presentation to a presentation audience.

23. The method of claim 22 wherein saving saves the multimedia script on an Internet hard drive.

24. The method of claim 22 wherein saving saves the multimedia script on the control computer.

25. The method of claim 22 wherein at least one slide is cut, copied and pasted into the slide presentation.

26. The method of claim 22 wherein at least one slide element is cut, copied and pasted into the slide presentation.

27. The method of claim 22 wherein editing of the multimedia presentation script, includes at least one of adding slides, reordering slides, duplicating slides and deleting slides.

28. The method of claim 22 wherein presenting the multimedia presentation script, includes at least one of adding slides, reordering slides, modifying slides duplicating slides and deleting slides.

* * * * *